Dec. 25, 1928.
H. P. DONLE
1,696,880
POWER SUPPLY
Filed Feb. 19, 1927
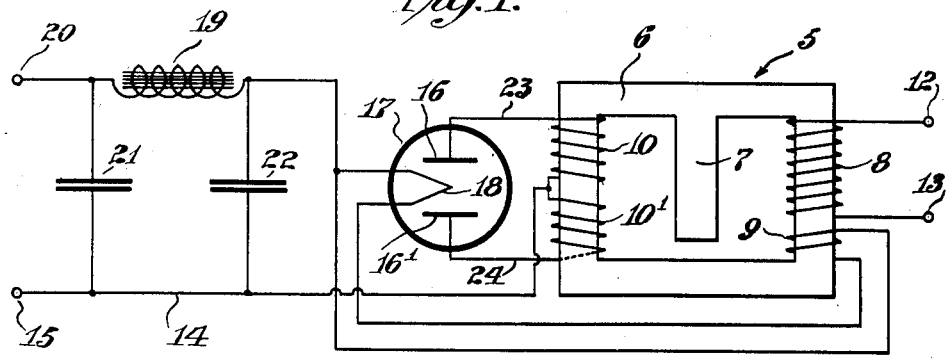
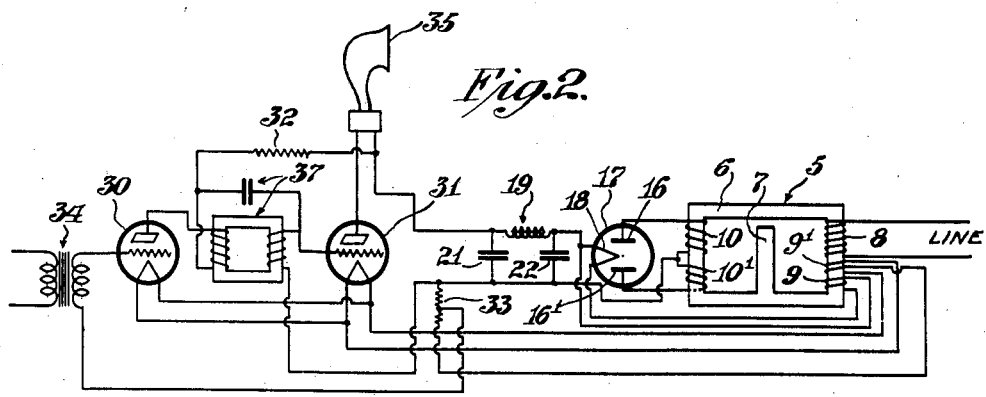
INVENTOR
H. P. Donle
ATTORNEY Patented Dec. 25, 1928.

1,696,880

UNITED STATES PATENT OFFICE.

HAROLD P. DONLE, OF MERIDEN, CONNECTICUT, ASSIGNOR TO DONLE ELECTRICAL PRODUCTS CORPORATION, OF MERIDEN, CONNECTICUT, A CORPORATION OF CONNECTICUT.

POWER SUPPLY.

Application filed February 19, 1927. Serial No. 169,564.

The main object of my invention is to produce a device for supplying power to the anode circuits of vacuum tubes from an alternating current source.

Another object is to produce a device of the nature above described which will be inexpensive to manufacture and yet have a direct current output having substantially no fluctations and suitable for the quiet operation of vacuum tube amplifiers, oscillators, modulators or detectors.

The usual devices of this nature consist of a transformer, a rectifier and a somewhat elaborate and expensive filter having inductors and capacities of large values. I have found that by constructing the transformer so that a large amount of magnetic leakage exists therein, I am able to use much smaller values of inductance and capacitance in the associated filter, thereby greatly reducing the manufacturing cost and improving the operation.

Referring to the drawings, Fig. 1 is a schematic wiring diagram of my power supply device.

Fig. 2 shows a two stage high capacity audio frequency amplifier embodying my invention.

In the embodiment of my invention shown in Fig. 1 the transformer 5 is provided with the closed iron core 6 having a leakage tongue 7 and carrying the windings 8, 9, 10 and 10'. The primary winding 8 is of suitable inductive value for connection to the alternating current house mains and is provided with suitable terminals, such as, 12 and 13. The windings 10 and 10' form a secondary with a center tap 11 which is connected by the conductor 14 to the output terminal 15. The extreme terminals of the windings 10 and 10' are connected to the anodes 16 and 16' of the full wave rectifier 17. The tertiary winding 9 supplies the required heating current for the cathode 18 of the rectifier 17.

The cathode 18 is also connected through the inductor 19 to the output terminal 20. On either side of the inductor 19 is connected one terminal of each of the condensers 21 and 22 and the remaining terminals of these condensers are connected to the line 14.

I have found that by building the transformer 5 with the leakage tongue 7 instead of the usual close-coupled type the value of the filter condensers 21 and 22 can be reduced to say one-fourth of the value usually found necessary to eliminate residual hum and that the inductor 19 may also have a lower value than is usual.

The effect of my leakage tongue appears to be equivalent to the insertion of chokes or inductors in the lines 23 and 24 which would tend to store up energy in the form of electromagnetic fields which would collapse slowly and therefore the condenser 22 would be charged with attenuated overlapping pulses of greater length than that of the half cycle of the primary frequency.

Fig. 2 shows a complete "power operated" 2-stage audio frequency amplifier requiring no batteries for its operation.

In this circuit the amplifier tubes 30 and 31 are supplied with anode voltage by my device. The cathodes of these tubes are heated from the fourth winding 9 which is provided with a mid-point connection which is used for a grid return to prevent hum. The anode voltage of the tube 30 is suitably reduced by the series resistor 32 and suitable grid biases are attained for both tubes from the current by means of the resistor 33, an input transformer is shown at 34 and a loud speaker at 35. The intervalve coupling unit 37 is preferably that disclosed in my co-pending application #98,451.

It should be understood that I do not wish to limit myself to the exact connections nor to the design of leakage transformer indicated, nor do I wish to limit myself to a hot cathode rectifier as a cold cathode or electrolytic type may be readily substituted.

I claim:—

1. A vacuum tube power supply consisting of a transformer having high magnetic leakage, said transformer having a primary winding suitable for operation on house lighting mains, a secondary winding suitable for supplying anode voltage, a rectifier associated with said secondary windings to produce unidirectional current and a simple filter system to smooth out the output of said rectifier.

2. In a power supply device for vacuum tubes, a rectifier, a filter and a transformer associated with said rectifier, said transformer having high leakage inductance, said leakage inductance serving as a part of said filter.

3. A power supply device for vacuum tubes consisting of a transformer having high magnetic leakage, said transformer having a primary winding, a secondary winding and a tertiary winding, a full wave rectifier and a capacitative-inductive filter, said primary winding being adapted for connection to the alternating current mains, said secondary winding being adapted to furnish a suitable voltage for anode circuit use when said voltage has been rectified by said rectifier and filtered by said filter and said tertiary winding being adapted to furnish current for heating the cathode of said rectifier.

4. A uni-directional current supply device having an alternating current input, said device consisting of a transformer, a rectifier and a simple filter, said transformer having a high magnetic leakage path and adaptable in combination with said filter and said rectifier for smoothing out the pulsations of said unidirectional current.

HAROLD P. DONLE.